(12) United States Patent
Wu et al.

(10) Patent No.: US 11,018,575 B2
(45) Date of Patent: May 25, 2021

(54) SEMICONDUCTOR ASSEMBLY AND CONTROL METHOD THEREOF

(71) Applicant: XI'AN JIAOTONG UNIVERSITY, Xi'an (CN)

(72) Inventors: Yifei Wu, Xi'an (CN); Yi Wu, Xi'an (CN); Fei Yang, Xi'an (CN); Chunping Niu, Xi'an (CN); Mingzhe Rong, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 16/712,704

(22) Filed: Dec. 12, 2019

(65) Prior Publication Data

US 2020/0343807 A1    Oct. 29, 2020

(30) Foreign Application Priority Data

Apr. 23, 2019    (CN) .......................... 201910332293.6

(51) Int. Cl.
*H02M 1/34* (2007.01)
*H02H 3/08* (2006.01)
*H02M 3/335* (2006.01)

(52) U.S. Cl.
CPC ................ *H02M 1/34* (2013.01); *H02H 3/08* (2013.01); *H02M 3/33576* (2013.01); *H02M 2001/346* (2013.01)

(58) Field of Classification Search
None
See application file for complete search history.

(56) References Cited

U.S. PATENT DOCUMENTS 4,926,304 A * 5/1990 iMarinus ........... H02M 3/33507
323/323

* cited by examiner

*Primary Examiner* — Jeffrey A Gblende
*Assistant Examiner* — Henry E Lee, III
(74) *Attorney, Agent, or Firm* — Dragon Sun Law Firm, PC; Jinggao Li, Esq.

(57) ABSTRACT

The present invention discloses a semiconductor assembly. The semiconductor assembly comprises a fully controlled power electronic device and a snubber circuit, wherein the snubber circuit is connected to the fully controlled power electronic device in parallel; the snubber circuit comprises a capacitor (C), an inductor (L), a resistor (R), a diode (D) and a half controlled power electronic device (A1); the inductor (L) and the half controlled power electronic device (A1) are connected in series and are together connected to the resistor (R) in parallel; and the diode (D) and the resistor (R) are connected in parallel and are together connected to the capacitor (C) in series.

19 Claims, 9 Drawing Sheets

SEMICONDUCTOR ASSEMBLY AND CONTROL METHOD THEREOF

CROSS-REFERENCE TO RELATED APPLICATIONS

This application claims priority to and the benefit of CN 2019103322936, filed Apr. 23, 2019. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD

The present invention relates to the technical field of electrical equipment, in particular to a semiconductor assembly for improving the large current turn-off capability of a fully controlled power electronic device.

BACKGROUND

Due to advantages of arc-free turn-off, large current capacity, fast turn-off speed and strong current limiting capability, a current turn-off assembly consisting of power semiconductor devices has become a research hotspot in the field of large capacity system turn-off. Compared with other mechanical assemblies, for turning off a current, the power semiconductor device with a fully control function has the advantages of faster turn-off speed and better turning off rated current. However, when a fully controlled power semiconductor device is used to turn off a large current, a turn-off failure is caused easily due to insufficient large-current turn-off capability.

The foregoing information disclosed in the background part is merely intended to enhance an understanding of the background of the present invention and may therefore contain information about the prior art that does not constitute public knowledge among persons of ordinary skill in the field in China.

Therefore, a heretofore unaddressed need exists in the art to address the aforementioned deficiencies and inadequacies.

SUMMARY

To overcome the foregoing deficiencies or defects of the prior art, the present invention aims to provide a semiconductor assembly and a control method thereof.

Specifically, the present invention uses the following technical solution:

a semiconductor assembly, comprising:
a fully controlled power electronic device; and
a snubber circuit, connected to the fully controlled power electronic device in parallel, wherein the snubber circuit includes a capacitor, an inductor, a resistor, a diode and a half controlled power electronic device; the inductor and the half controlled power electronic device are connected in series and are together connected to the resistor in parallel; and the diode and the resistor are connected in parallel and are together connected to the capacitor in series.

In the semiconductor assembly, the cathode of the diode is connected to the capacitor; the inductor is connected to the half controlled power electronic device in series; a first end point is disposed between the diode and the capacitor; a second end point is disposed between the inductor and the half controlled power electronic device; a third end point is disposed between the diode and the inductor; the half controlled power electronic device is connected between the first end point and the second end point; and the resistor is connected between the first end point and the third end point.

In the semiconductor assembly, the fully controlled power electronic device is a combination of a plurality of fully controlled power electronic device bodies that are connected in series or in parallel.

In the semiconductor assembly, the semiconductor assembly further includes an energy consumption circuit that is connected to the snubber circuit in parallel.

In the semiconductor assembly, the fully controlled power electronic device includes any one or any combination of an MOSFET, an IGCT, an IGBT, an IEGT and a GTO.

In the semiconductor assembly, the half-controlled power electronic device includes any one or any combination of a thyristor, an IGBT, an IGCT and an IEGT.

In the semiconductor assembly, the capacitor includes any one or any combination of a thin-film capacitor, an organic dielectric capacitor, an inorganic dielectric capacitor, an electrolytic capacitor, an electric heating capacitor and an air dielectric capacitor; the inductor includes any one or any combination of a wire wound inductor, a multilayer chip inductor and a thin-film inductor; the resistor includes any one or any combination of a wire wound resistor, a carbon film resistor, a metal film resistor and a metal oxide film resistor; and the diode is an uncontrollable unidirectionally turned on power semiconductor device or a combination of uncontrollable unidirectionally turned on power semiconductor devices.

In the semiconductor assembly, an uncontrollable unidirectionally turned on power semiconductor device includes any one or any combination of a power diode and a Schottky diode.

According to another aspect of the present invention, a control method using the semiconductor assembly includes the following steps.

Step 1: When a current starts to rise, the fully controlled power electronic device is turned on, and the current transfers to the fully controlled power electronic device.

Step 2: After a current of the fully controlled power electronic device rises to a preset value, the fully controlled power electronic device is turned off. In this case, the current transfers to the snubber circuit, to charge the capacitor of the snubber circuit.

Step 3: After a Δt1 time interval, the fully controlled power electronic device is turned on again. In this case, the current transfers to a branch of the fully controlled power electronic device and continues to rise, and the capacitor in the snubber circuit cannot discharge electricity because the diode is not turned on reversely.

Step 4: After a Δt2 time interval, the half-controlled power electronic device in the snubber circuit is turned on. In this case, the inductor and the capacitor in the snubber circuit and the fully controlled power electronic device form a resonance circuit, underdamped resonance occurs in the current, and the current is superimposed on an original current.

Step 5: When the current resonates to a first trough, the current drops into a turn-off capability range of the fully controlled power electronic device, and then the fully controlled power electronic device is turned off, so that current is reduced to zero, and current turn-off is completed.

According to another aspect of the present invention, a control method using the semiconductor assembly includes the following steps.

Step 1: When a current starts to rise, the fully controlled power electronic device is not turned on, and the current flows to the snubber circuit, to charge an absorption capacitor via the diode.

Step 2: After a Δt1 time interval, the fully controlled power electronic device is turned on, a current transfers to the fully controlled power electronic device and rises continuously, and the absorption capacitor in the snubber circuit cannot discharge electricity because the diode is not turned on reversely.

Step 3: After a Δt2 time interval, the half-controlled power electronic device in the snubber circuit is turned on. In this case, the inductor and the capacitor in the snubber circuit and a branch of the fully controlled power electronic device form a resonance circuit, underdamped resonance occurs in the current, and the current is superimposed on an original current.

Step 4: When the current resonates to a first trough, the current drops into a turn-off capability range of the fully controlled power electronic device, and then the fully controlled power electronic device is turned off, so that current is reduced to zero, and current turn-off is completed.

Beneficial effects are as follows.

The present invention uses a half-controlled power electronic device to implement auxiliary turn-off of a current. The integrated design is convenient to implement, and usage of a device of higher power is avoided, thereby effectively reducing production costs, improving turn-off capability, and enhancing apparatus capacity.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

With reference to the accompanying drawings, the foregoing and other purposes, features and advantages of the present invention are better understood through the following illustrative and non-restrictive detailed descriptions of the embodiments of the present invention, wherein.

All the drawings are schematic and do not have to be exact. Further description of the present invention is given below in combination with the accompanying drawings and the embodiments.

DETAILED DESCRIPTION OF THE EMBODIMENTS

The following detailed descriptions are in fact illustrative and are not intended to restrict application and use. In addition, it is not intended to be subject to any explicit or implied theoretical constraints presented in the technical field, background, brief overview or detailed description below. Unless explicitly described to the contrary, the word "including" and its various variations shall be understood to include mentioned parts implicitly but not to exclude any other parts.

Specific implementations of the present invention are described below in combination with the accompanying FIGS. 1 to 9.

Figure 1:
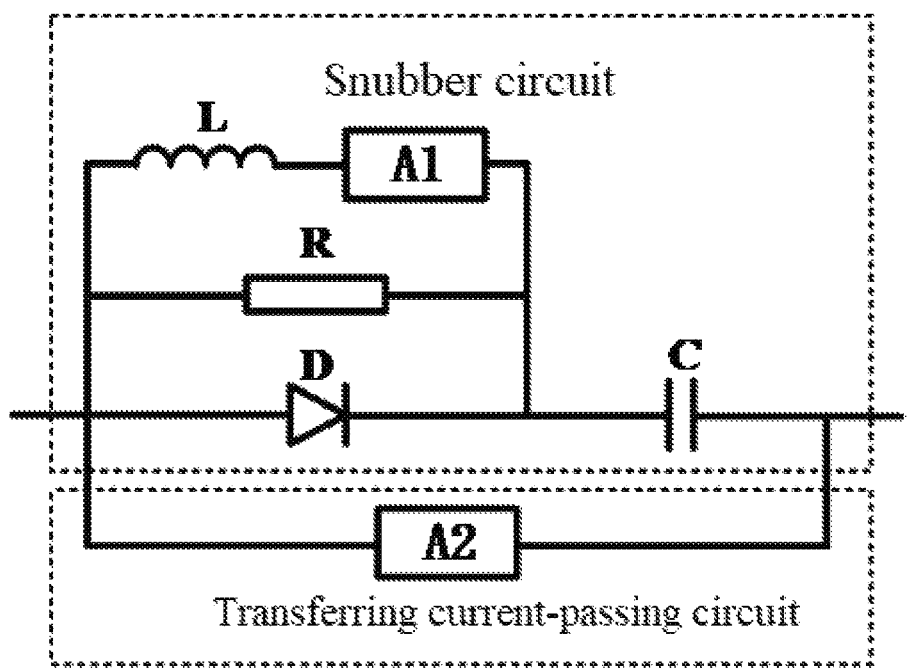
FIG. 1 is a schematic structural diagram of an assembly body.

FIG. 1 is a schematic structural diagram of a breaker body, wherein a semiconductor assembly includes:

a fully controlled power electronic device A2, and a snubber circuit, connected to the fully controlled power electronic device in parallel, wherein the snubber circuit includes a capacitor C, an inductor L, a resistor R, a diode D and a half controlled power electronic device A1; the inductor L and the half controlled power electronic device A1 are connected in series and are together connected to the resistor R in parallel; and the diode D and the resistor R are connected in parallel and are together connected to the capacitor C in series.

The present invention discloses a semiconductor assembly for improving a turn-off capability of a fully controlled power electronic device and a control method using the semiconductor assembly. When the semiconductor assembly needs to turn off a current, auxiliary turn-off is performed by controlling a half-controlled power electronic device in a snubber circuit, so that the turn-off capability can be improved obviously, usage of a device of higher power is avoided, and production costs are reduced.

In an embodiment of the semiconductor assembly, the cathode of the diode D is connected to the capacitor C; the inductor L and the half controlled power electronic device A1 are connected in series; a first end point is disposed between the diode D and the capacitor C; a second end point is disposed between the inductor L and the half controlled power electronic device A1; a third end point is disposed between the diode D and inductor L; the half controlled power electronic device A1 is connected between the first end point and the second end point; and the resistor R is connected between the first end point and the third end point.

In another embodiment of the semiconductor assembly, the fully controlled power electronic device is a combination of a plurality of fully controlled power electronic device bodies that are connected in series or in parallel.

In another embodiment of the semiconductor assembly, the semiconductor assembly further includes an energy consumption circuit that is connected to the snubber circuit in parallel.

In another embodiment of the semiconductor assembly, the fully controlled power electronic device A2 includes any one or any combination of an MOSFET, an IGCT, an IGBT, an IEGT and a GTO.

In another embodiment of the semiconductor assembly, the half-controlled power electronic device A1 includes any one or any combination of a thyristor, an IGBT, an IGCT, and an IEGT.

In another embodiment of the semiconductor assembly, the capacitor C includes any one or any combination of a thin-film capacitor, an organic dielectric capacitor, an inorganic dielectric capacitor, an electrolytic capacitor, an electric heating capacitor and an air dielectric capacitor; the inductor L includes any one or any combination of a wire wound inductor, a multilayer chip inductor and a thin-film inductor; the resistor R includes any one or any combination of a wire wound resistor, a carbon film resistor, a metal film resistor and a metal oxide film resistor; and the diode D is an uncontrollable unidirectionally turned on power semiconductor device or a combination of uncontrollable unidirectionally turned on power semiconductor devices.

In another embodiment of the semiconductor assembly, an uncontrollable unidirectionally turned on power semiconductor device includes any one or any combination of a power diode and a Schottky diode.

Figure 2:
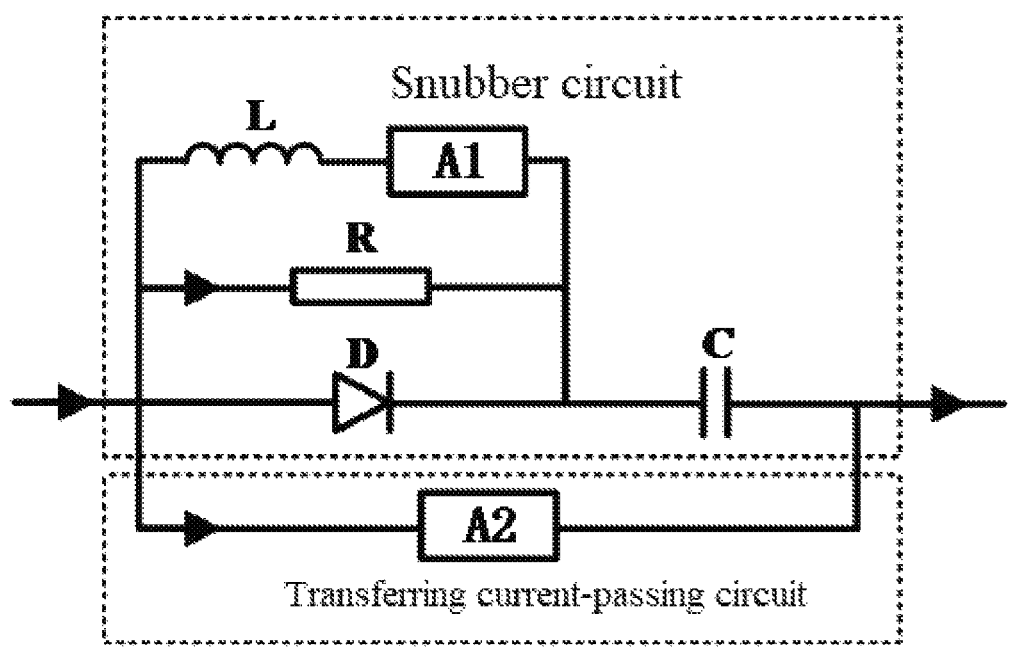
FIG. 2 is a schematic structural diagram of the assembly according to the present invention during work.

For further understanding of the present invention, to better describe a current turn-off process of the semiconductor assembly, an embodiment provides a schematic structural diagram of a semiconductor assembly in which current flows from left to right as shown in FIG. 2.

Referring to FIG. 2, the assembly includes a fully controlled power electronic device and a snubber circuit. The fully controlled power electronic device is connected to the snubber circuit in parallel.

The snubber circuit is formed by connecting a capacitor C, an inductor L, a resistor R, a diode D and a half-controlled power electronic device A1 in series and in parallel.

The fully controlled power electronic device A2 may be a fully controlled power electronic device having a current turn-off capability, and includes but is not limited to any one or any combination of an MOSFET, an IGCT, an IGBT, an IEGT and a GTO.

Preferably, a connection relationship of the snubber circuit is that: the cathode of the diode D is connected to the capacitor C; the inductor L and the half controlled power electronic device A1 are connected in series; a first end point is disposed between the diode D and the capacitor C; a second end point is disposed between the inductor L and the half controlled power electronic device A1; a third end point is disposed between the diode D and the inductor L; the half controlled power electronic device A1 is connected between the first end point and the second end point; and the resistor R is connected between the first end point and the third end point.

Preferably, the capacitor C includes but is not limited to any one or any combination of a thin-film capacitor, an organic dielectric capacitor, an inorganic dielectric capacitor, an electric heating capacitor and an air dielectric capacitor; the inductor L includes but is not limited to any one or any combination of a wire wound inductor, a multilayer chip inductor and a thin-film inductor; the resistor R includes but is not limited to any one or any combination of a wire wound resistor, a carbon film resistor, a metal film resistor and a metal oxide film resistor; and the diode D is an uncontrollable unidirectionally turned on power semiconductor device or a combination of uncontrollable unidirectionally turned on power semiconductor devices, and includes but is not limited to any one or any combination of a power diode and a Schottky diode. The half-controlled power electronic device A1 is a half-controlled power electronic device having a current turn-off capability, and includes but is not limited to any one or any combination of a thyristor, an IGBT, an IGCT and an IEGT.

In an embodiment, the fully controlled power electronic device may be a fully controlled power electronic device having a current turn-off capability, and includes but is not limited to any one or any combination of an MOSFET, an IGCT, an IGBT, an IEGT and a GTO.

In an embodiment, the half-controlled power electronic device may be a half-controlled power electronic device having a current turn-off capability, and includes but is not limited to any one or any combination of a thyristor, an IGBT, an IGCT and an IEGT.

Figure 6:
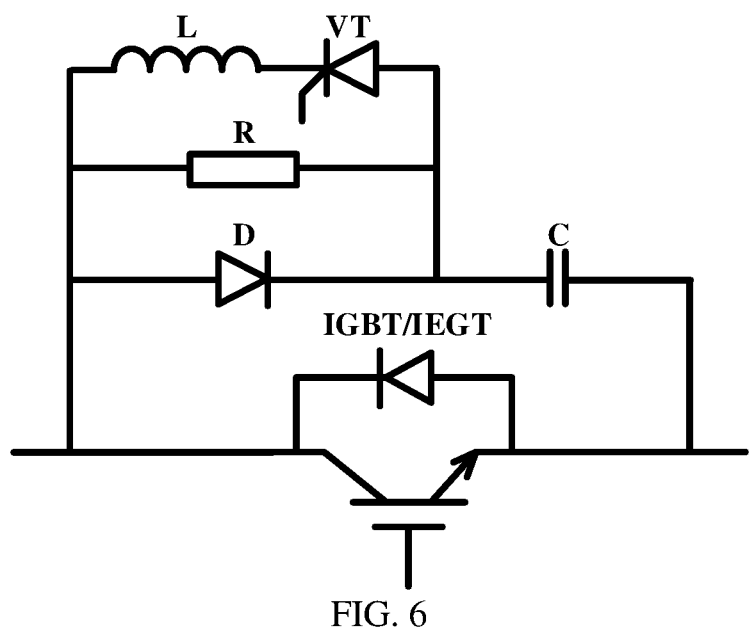
FIG. 6 is a schematic structural diagram according to a specific embodiment of the present invention.
Figure 7:
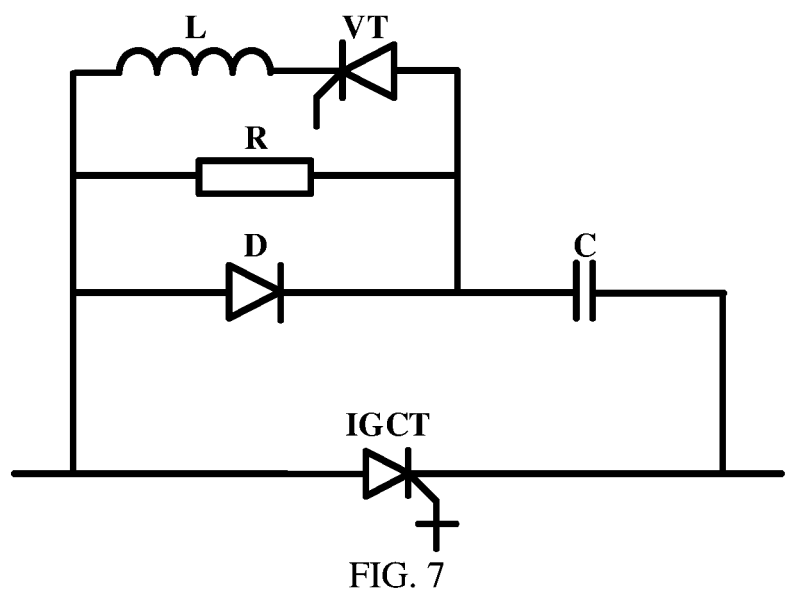
FIG. 7 is a schematic structural diagram according to a specific embodiment of the present invention.

In an embodiment, FIG. 6 to FIG. 7 show specific embodiments of fully controlled power electronic devices in which specific devices such as an IGBT, an IEGT and an IGCT are used as power semiconductor devices.

Figure 8:
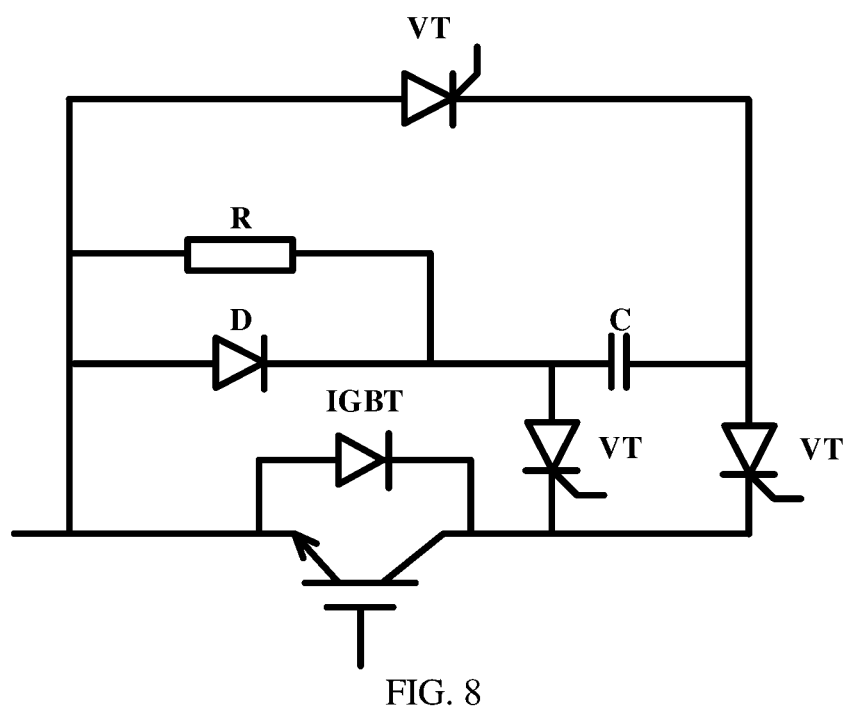
FIG. 8 is a variant schematic structural diagram according to a specific embodiment of the present invention.

In an embodiment, FIG. 8 shows a specific embodiment in which an inverse topology is used as a snubber circuit.

Figure 9:
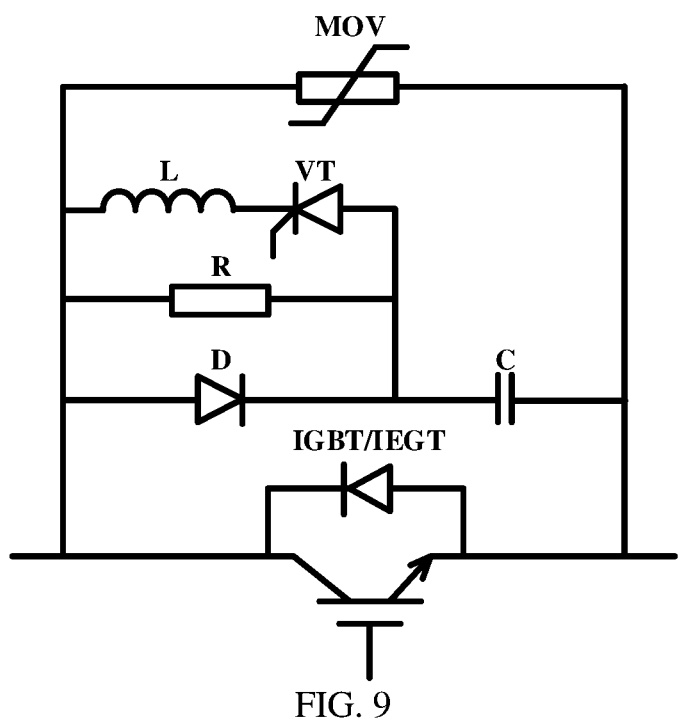
FIG. 9 is a schematic structural diagram according to a specific embodiment of the present invention.

In an embodiment, FIG. 9 shows a specific embodiment in which a matched energy consumption circuit is used as a snubber circuit.

Different from the scenarios shown in the figures, the present invention does not require a circuit in the assembly to be completely symmetric.

In the present invention, a control method using the semiconductor assembly includes the following steps.

Step 1: When a current starts to rise, the fully controlled power electronic device is turned on, and the current transfers to the fully controlled power electronic device.

Step 2: After a current of the fully controlled power electronic device rises to a preset value, the fully controlled power electronic device is turned off. In this case, the current transfers to the snubber circuit, to charge the capacitor of the snubber circuit.

Step 3: After a $\Delta t1$ time interval, the fully controlled power electronic device is turned on again. In this case, the current transfers to a branch of the fully controlled power electronic device and continues to rise, and the capacitor in the snubber circuit cannot discharge electricity because the diode is not turned on reversely.

Step 4: After a $\Delta t2$ time interval, the half-controlled power electronic device in the snubber circuit is turned on. In this case, the inductor and the capacitor in the snubber circuit and the fully controlled power electronic device form a resonance circuit, underdamped resonance occurs in the current, and the current is superimposed on an original current.

Step 5: When the current resonates to a first trough, the current drops into a turn-off capability range of the fully controlled power electronic device, and then the fully controlled power electronic device is turned off, so that current is reduced to zero, and current turn-off is completed.

Figure 3:
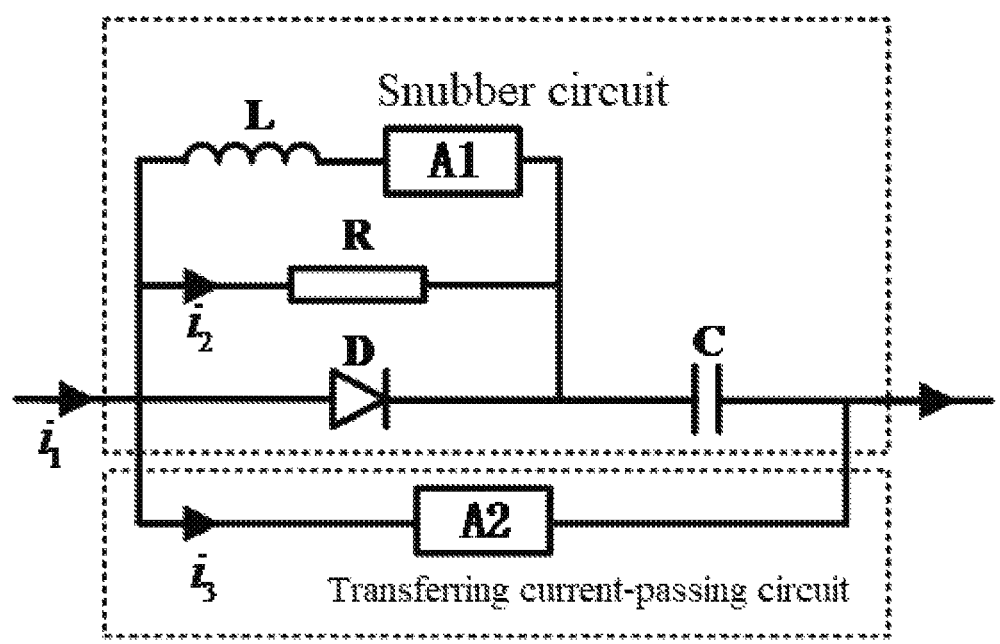
FIG. 3 is a schematic diagram of a circuit current flag of the assembly during current turn-off.

FIG. 3 further shows a current flag of a branch of the fully controlled power electronic devices during current turn-off, wherein i1 is a total current, i2 is a current flowing through a snubber circuit, and i3 is a current flowing through a branch of a fully controlled power electronic device.

Figure 4A:
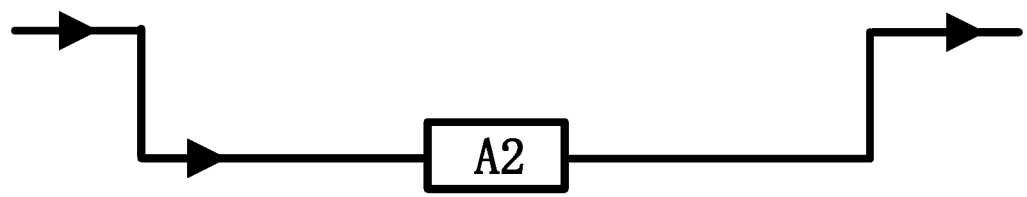
FIG. 4(a) to FIG. 4(c) are flow diagrams of circuit currents of the assembly during current turn-off.
Figure 4B:
Figure 4C:
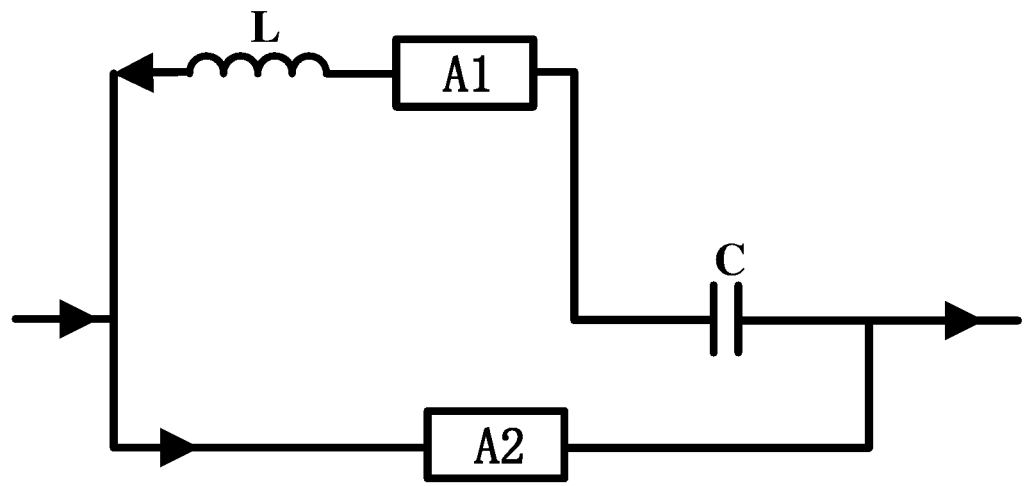
Figure 5:
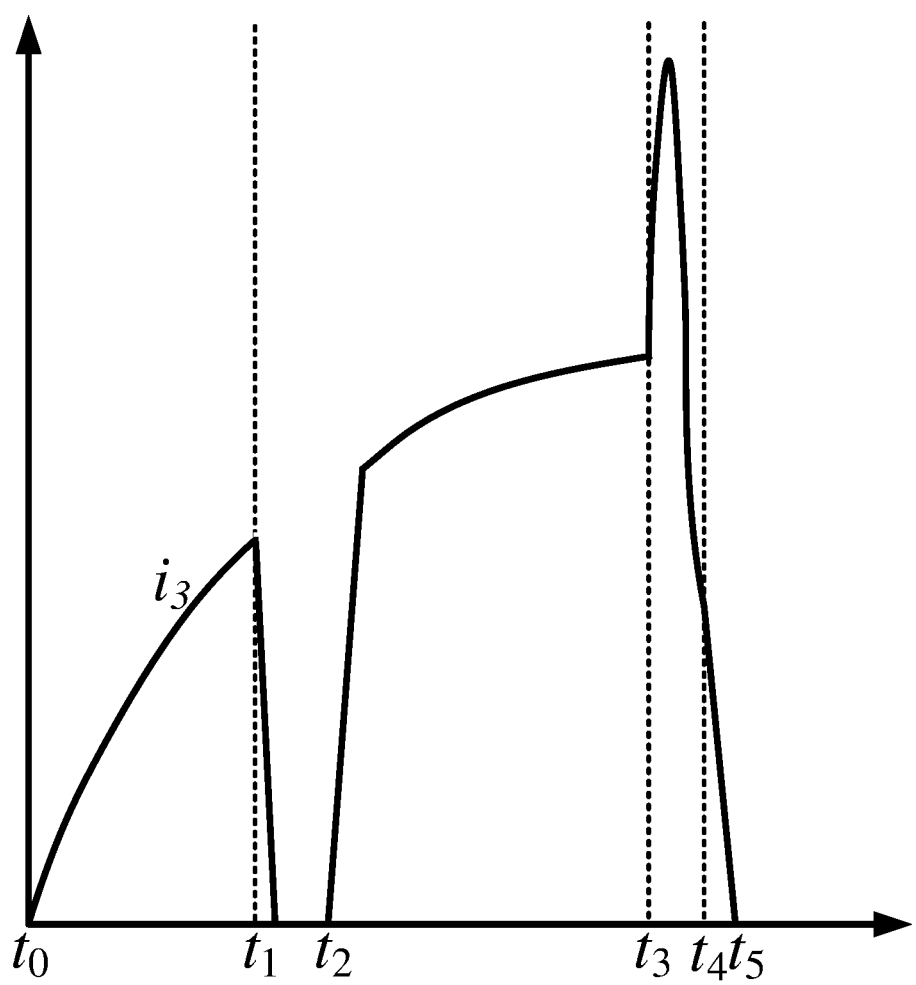
FIG. 5 is a curve diagram of current changes in a branch of a fully controlled power electronic device during current turn-off.

FIG. 4(a) to FIG. 4(c) show directions of currents in a branch of a fully controlled power electronic device during current turn-off. Specifically, the directions are directions of currents of branches corresponding to moments t0 to t5. FIG. 5 shows a current change curve of a branch of a fully controlled power electronic device during current turn-off.

In an implementation summary, specific operation steps of the control methods include the following aspects.

At the moment t0, when a current starts to rise, the fully controlled power electronic device is turned on, and the current transfers to a branch of the fully controlled power electronic device.

At the moment t1, after a current in the branch of the fully controlled power electronic device rises to a certain value, the fully controlled power electronic device is turned off. In this case, the current transfers to the snubber circuit, to charge an absorption capacitor in the snubber circuit.

At the moment t2, the fully controlled power electronic device is turned on again. In this case, the current transfers to the branch of the fully controlled power electronic device and rises continuously, and the absorption capacitor in the snubber circuit cannot discharge electricity because the diode is not turned on reversely.

At the moment t3, the half-controlled power electronic device in the snubber circuit is turned on. In this case, the inductor and the capacitor in the snubber circuit and the branch of the fully controlled power electronic device form a resonance circuit, underdamped resonance occurs in the current, and the current is superimposed on an original current.

At the moment t4, when the current resonates to a first trough, the current drops into a turn-off capability range of the fully controlled power electronic device, and then the fully controlled power electronic device is turned off.

At the moment t5, the current in the branch of the fully controlled power electronic device is zero, and current turn-off of the assembly current is completed.

In an implementation, a control method using the semiconductor assembly includes the following steps.

Step 1: When a current starts to rise, the fully controlled power electronic device is not turned on, and the current flows to the snubber circuit, to charge an absorption capacitor via the diode.

Step 2: After a Δt1 time interval, the fully controlled power electronic device is turned on, a current transfers to the fully controlled power electronic device and rises continuously, and the absorption capacitor in the snubber circuit cannot discharge electricity because the diode is not turned on reversely.

Step 3: After a Δt2 time interval, the half-controlled power electronic device in the snubber circuit is turned on. In this case, the inductor and the capacitor in the snubber circuit and a branch of the fully controlled power electronic device form a resonance circuit, underdamped resonance occurs in the current, and the current is superimposed on an original current.

Step 4: When the current resonates to a first trough, the current drops into a turn-off capability range of the fully controlled power electronic device, and then the fully controlled power electronic device is turned off, so that current is reduced to zero, and current turn-off is completed.

The foregoing further describes the present invention in detail with reference to specific preferable implementations, but it should not be concluded that specific implementations of the present invention are limited thereto. A person of ordinary skill in the technical field to which the present invention belongs may further make some simple deduction or replacement without separating from the conception of the present invention, for example, deduces unidirectional semiconductor assemblies based on a unidirectional solid-state switch branch and a unidirectional oscillation branch. Such deduction or replacement should be regarded as belonging to a protection scope determined according to the claims of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A semiconductor assembly, comprising:
a fully controlled power electronic device; and
a snubber circuit, connected to the fully controlled power electronic device in parallel, wherein the snubber circuit comprises a capacitor (C), an inductor (L), a resistor (R), a diode (D) and a half controlled power electronic device (Al); the inductor (L) and the half controlled power electronic device (A1) are connected in series and are together connected to the resistor (R) in parallel; and the diode (D) and the resistor (R) are connected in parallel and are together connected to the capacitor (C) in series, wherein the cathode of the diode (D) is connected to the capacitor (C); the inductor (L) is connected to the half controlled power electronic device (A1) in series; a first end point is disposed between the diode (D) and the capacitor (C); a second end point is disposed between the inductor (L) and the half controlled power electronic device (A1); a third end point is disposed between the diode (D) and the inductor (L); the half controlled power electronic device (A1) is connected between the first end point and the second end point; and the resistor (R) is connected between the first end point and the third end point.

2. A semiconductor assembly, comprising:
a fully controlled power electronic device; and
a snubber circuit, connected to the fully controlled power electronic device in parallel, wherein the snubber circuit comprises a capacitor (C), an inductor (L), a resistor (R), a diode (D) and a half controlled power electronic device (A1); the inductor (L) and the half controlled power electronic device (A1) are connected in series and are together connected to the resistor (R) in parallel; and the diode (D) and the resistor (R) are connected in parallel and are together connected to the capacitor (C) in series, wherein the fully controlled power electronic device is a combination of a plurality of fully controlled power electronic device bodies that are connected in series and in parallel.

3. A semiconductor assembly, comprising:
a fully controlled power electronic device; and
a snubber circuit, connected to the fully controlled power electronic device in parallel, wherein the snubber circuit comprises a capacitor (C), an inductor (L), a resistor (R), a diode (D) and a half controlled power electronic device (A1); the inductor (L) and the half controlled power electronic device (A1) are connected in series and are together connected to the resistor (R) in parallel; and the diode (D) and the resistor (R) are connected in parallel and are together connected to the capacitor (C) in series, wherein the semiconductor assembly further comprises an energy consumption circuit that is connected to the snubber circuit in parallel.

4. The semiconductor assembly according to claim 1, wherein the fully controlled power electronic device (A2) comprises any one or any combination of the following: an MOSFET, an IGCT, an IGBT, an IEGT and a GTO.

5. The semiconductor assembly according to claim 1, wherein the half-controlled power electronic device (A1) comprises any one or any combination of the following: a thyristor, an IGBT, an IGCT and an IEGT.

6. The semiconductor assembly according to claim 1, wherein the capacitor (C) comprises any one or any combination of the following: a thin-film capacitor, an organic dielectric capacitor, an inorganic dielectric capacitor, an electrolytic capacitor, an electric heating capacitor and an air dielectric capacitor; the inductor (L) comprises any one or any combination of the following: a wire wound inductor, a multilayer chip inductor and a thin-film inductor; the resistor (R) comprises any one or any combination of the following: a wire wound resistor, a carbon film resistor, a metal film resistor and a metal oxide film resistor; and the diode (D) comprises an uncontrollable unidirectionally turned on power semiconductor device.

7. The semiconductor assembly according to claim 6, wherein the uncontrollable unidirectionally turned on power semiconductor device comprises any one or any combination of the following: a power diode and a Schottky diode.

8. A turn-off method using the semiconductor assembly according to claim 1, comprising the following steps:
  step 1: when a current starts to rise, the fully controlled power electronic device is turned on, and the current transfers to the fully controlled power electronic device;
  step 2: after a current of the fully controlled power electronic device rises to a preset value, the fully controlled power electronic device is turned off, in this case, the current transfers to the snubber circuit, to charge the capacitor of the snubber circuit;
  step 3: after a Δt1 time interval, the fully controlled power electronic device is turned on again, in this case, the current transfers to a branch of the fully controlled power electronic device and continues to rise, and the capacitor in the snubber circuit cannot discharge electricity because the diode is not turned on reversely;
  step 4: after a Δt2 time interval, the half controlled power electronic device in the snubber circuit is turned on, in this case, the inductor and the capacitor in the snubber circuit and the fully controlled power electronic device form a resonance circuit, underdamped resonance occurs in the current, and the current is superimposed on an original current; and
  step 5: when the current resonates to a first trough, the current drops into a turn-off capability range of the fully controlled power electronic device, and then the fully controlled power electronic device is turned off, so that current is reduced to zero, and current turn-off is completed.

9. A turn-off method using the semiconductor assembly according to claim 1, comprising the following steps:
  step 1: when a current starts to rise, the fully controlled power electronic device is not turned on, and the current flows to the snubber circuit, to charge an absorption capacitor via the diode;
  step 2: after a Δt1 time interval, the fully controlled power electronic device is turned on, a current transfers to the fully controlled power electronic device and rises continuously, and the absorption capacitor in the snubber circuit cannot discharge electricity because the diode is not turned on reversely;
  step 3: after a Δt2 time interval, the half-controlled power electronic device in the snubber circuit is turned on. In this case, the inductor and the capacitor in the snubber circuit and a branch of the fully controlled power electronic device form a resonance circuit, underdamped resonance occurs in the current, and the current is superimposed on an original current; and
  step 4: when the current resonates to a first trough, the current drops into a turn-off capability range of the fully controlled power electronic device, and then the fully controlled power electronic device is turned off, so that current is reduced to zero, and current turn-off is completed.

10. The turn-off method according to claim 8, wherein the cathode of the diode (D) is connected to the capacitor (C); the inductor (L) is connected to the half controlled power electronic device (A1) in series; a first end point is disposed between the diode (D) and the capacitor (C); a second end point is disposed between the inductor (L) and the half controlled power electronic device (A1); a third end point is disposed between the diode (D) and the inductor (L); the half controlled power electronic device (A1) is connected between the first end point and the second end point; and the resistor (R) is connected between the first end point and the third end point.

11. The turn-off method according to claim 8, wherein the fully controlled power electronic device is a combination of a plurality of fully controlled power electronic device bodies that are connected in series and in parallel.

12. The turn-off method according to claim 8, wherein the semiconductor assembly further comprises an energy consumption circuit that is connected to the snubber circuit in parallel.

13. The turn-off method according to claim 8, wherein the fully controlled power electronic device (A2) comprises any one or any combination of the following: an MOSFET, an IGCT, an IGBT, an IEGT and a GTO.

14. The turn-off method according to claim 8, wherein the half-controlled power electronic device (A1) comprises any one or any combination of the following: a thyristor, an IGBT, an IGCT and an IEGT.

15. The turn-off method according to claim 8, wherein the capacitor (C) comprises any one or any combination of the following: a thin-film capacitor, an organic dielectric capacitor, an inorganic dielectric capacitor, an electrolytic capacitor, an electric heating capacitor and an air dielectric capacitor; the inductor (L) comprises any one or any combination of the following: a wire wound inductor, a multilayer chip inductor and a thin-film inductor; the resistor (R) comprises any one or any combination of the following: a wire wound resistor, a carbon film resistor, a metal film resistor and a metal oxide film resistor; and the diode (D) comprises an uncontrollable unidirectionally turned on power semiconductor device.

16. The turn-off method according to claim 15, wherein the uncontrollable unidirectionally turned on power semiconductor device comprises any one or any combination of the following: a power diode and a Schottky diode.

17. The turn-off method according to claim 9, wherein the cathode of the diode (D) is connected to the capacitor (C); the inductor (L) is connected to the half controlled power electronic device (A1) in series; a first end point is disposed between the diode (D) and the capacitor (C); a second end point is disposed between the inductor (L) and the half controlled power electronic device (A1); a third end point is disposed between the diode (D) and the inductor (L); the half controlled power electronic device (A1) is connected between the first end point and the second end point; and the resistor (R) is connected between the first end point and the third end point.

18. The turn-off method according to claim 9, wherein the fully controlled power electronic device is a combination of a plurality of fully controlled power electronic device bodies that are connected in series and in parallel.

19. The turn-off method according to claim 9, wherein the semiconductor assembly further comprises an energy consumption circuit that is connected to the snubber circuit in parallel.

\* \* \* \* \*